United States Patent Office 3,492,243
Patented Jan. 27, 1970

3,492,243
ORGANIC SOLVENT FOR PROLAMINS
Theodore R. Newman, Oak Lawn, and Dean G. Hepfer, Peoria, Ill., assignors to Nalco Chemical Company, Chicago, Ill., a corporation of Delaware
No Drawing. Filed Jan. 6, 1967, Ser. No. 607,660
Int. Cl. C08f 45/44; C07g 7/00; B01f 1/00
U.S. Cl. 252—364                 1 Claim

ABSTRACT OF THE DISCLOSURE

This specification discloses an improved solvent for prolamin which comprises an aqueous alcohol and a polymer.

---

This invention relates ot an improved solvent system for prolamin. More specifically, the invention relates to a solvent which is able to contain prolamin in solution at high concentrations.

Prolamins, the alcohol soluble proteins occurring in cereal seeds, have been found to be useful in a number of applications. One of the most useful of the prolamins is zein. Zein is presently used extensively as a coating in the manufacture of paper, particularly in moisture and fat resistant paper for use in food wrap. Zein has also been used as an additive in high quality adhesives and in the manufacture of protein fiber. The manufacture of fiber from zein has not been practiced extensively on a commercial scale due to the relative difficulty and expense involved in obtaining the zein itself. However, zein fibers have very many desirable attributes and would probaby be manufactured extensivey if methods of manufacture of zein were improved.

The process of manufacturing zein, or other prolamin, is one in which the zein is first separated from gluten and other material, with which it normally occurs, by dissolving the zein in aqueous alcohol. The solution of zein in aqueous alcohol is then concentrated in a distillation unit so that as much of the alcohol as possible can be reclaimed and recycled for reuse in dissolving zein. The greatest problem with this process occurs because zein is relatively insoluble in water. As the solution of alcohol, water and zein is concentrated, the zein tends to fall out of solution and form large waxy globules, which tend to deposit out on the trays or other internal surfaces of the distillation unit. These deposits greatly decrease the usable zein output of the unit and result in frequent shutdowns of the unit for cleaning.

The above-mentioned problems of prior art solvent systems have greatly burdened the manufacture of zein. It would, therefore, be of great benefit to the art if an improved solvent could be used for zein or other prolamin, so that zein would remain in solution at higher concentrations. It would also be of great benefit to the art if the improved solvent acted in such a way that any zein which would come out of solution would be finely dispersed, so that the practical result would be the same as if the zein stayed in solution.

It therefore becomes an object of the invention to provide an improved solvent system for prolamin.

A specific object of the invention is to provide a solvent which is capable of maintaining prolamin in solution at higher concentrations than heretofore obtained.

Yet another object is to provide a method of concentrating a solution of prolamin in aqueous alcohol, whereby the prolamin would remain in solution or at least disperse in the water and alcohol so as not to agglomerate and deposit itself upon the internal surfaces of equipment used in concentrating the solution.

Other objects will appear hereinafter.

In its broadest aspects the invention pertains to an improved organic solvent for prolamin comprising an aqueous alcohol and a polymer. More particularly, this invention inloves an improved organic solvent for zein. Polymers suitable for use in the solvent of the subject invention are characterized as having from 20–30% amide groups and from 70–80% carboxyl groups and a molecular weight of under 100,000. More preferably the molecular weight of the polymer should be from 5,000 to 40,000 and most preferably from 10,000 to 30,000.

Polymers suitable for use in the subject invention are hydrolyzed polyacrylonitrile polymers or polymers produced by a copolymerization reaction and having substantially the same structure as hydrolyzed polyacrylonitrile polymers. Many known methods of manufacturing polymers are suitable for use in the present invention; one method is shown as Example 1 below.

The alcohol referred to as a component of the solvent of the subject invention is most commonly isoporpyl alcohol; however, ethyl, methyl, propyl and other water soluble alcohols may also be used. The aqueous alcohol referred to in the subject invention is a combination of alcohol and water which ranges from as high as 90% alcohol, upon initial dissolution of the prolamin, to as low as 5% alcohol in the discharge from the distillation column which contains the zein. It is at this lower alcohol concentration that the polymer becomes particularly useful in increasing the ability of the solvent to keep the zein from falling out of solution. The compositions which represent the two ends of the useful range of compositions of the solvent are shown in Table 1 below.

TABLE 1

| Ingredient: | Weight percent range |
|---|---|
| Alcohol | 90.0–5.0 |
| Water | 9.9900–94.9997 |
| Polymer | 0.0003–0.0100 |

A preferred quantity of polymer corresponds to 0.0030 weight percent of the total composition. It has been found that solvents within the composition range shown in Table 1 are particularly useful in maintaining zein in solution during processes in which alcohol is distilled out of the solution. These solvents allow for the recovery of a higher percentage of the alcohol which is initially used in dissolving zein. They also allow for a longer continuous operation of alcohol recovery stills without the need for shutdowns to clean trays and other internal surfaces of waxy zein deposits which commonly occur with prior art solvents. Correspondingly, the solvents afford a higher rate of zein recovery at the discharge of the distillation unit. Other advantages are to be noted.

A useful method of making a polymer which is suitable as a component of the solvent of the subject invention and an example of the effectiveness and use of the solvent of the subject invention are shown below. It is understood, of course, that these examples are merely illustrative, and that the invention is not limited thereto.

Example 1

This example shows a suitable process for preparing polyacrylonitrile and caustic hydrolyzing it to produce the polymers used in the invention. The ingredients that were used in the process include the following:

| Ingredient: | Parts (by weight) |
|---|---|
| Acrylonitrile | 14.7 |
| Water (deionized) | 51.0 |
| 10% ammonium persulfate solution | 6.9 |
| 10% sodium bisulfite solution | 27.4 |
| Total | 100.0 |

The acrylonitrile and water were mixed together in a flask equipped with an agitator, thermometer, and condenser and warmed to 50° C. The ammonium persulfate solution was added to the mixture and two minutes later the sodium bisulfite solution was added. Initiation of polymerization occurred almost immediately. The temperature, which had dropped to 45° C., was allowed to rise at 1.5–2.0 degrees/min. up to 64° C. with partial cooling. The reaction mixture was then cooled and maintained at 55° C. for 3½ hours. The solution was then heated to 80° C. for one-half hour under slight vacuum to remove traces of unreacted acrylonitrile.

There are several methods that can be used to hydrolyze the polyacrylonitrile. Probably the best method is to hydrolyze the polyacrylonitrile slurry with sodium hydroxide in an aqueous medium. One of the problems involved in this procedure is due to the high viscosity level that is reached during the initial stage of the hydroylsis. In order to avoid this difficulty, the polyacrylonitrile can be added to the hydrolyzing medium over a 50–90 minute period. In an illustrative hydroylsis treatment, 24.4 parts by weight of a 50% NaOH solution was placed in a clean reaction vessel equipped with a stirrer, thermometer, and reflux condenser and heated to 90° C. One hundred (100) parts by weight of a 14.7% polyacrylonitrile slurry in water was then fed continuously to the reaction vessel over a 50 minute period. After the last portion of polyacrylonitrile was added, the reaction was heated at 90–100° C. At regular intervals, samples were withdrawn, cooled rapidly to room temperature, and submitted for evaluation. Optimum properties were obtained with material that was hydrolyzed for 2.5–5.0 hours. Length of hydrolysis is dependent on temperature. Analysis by infrared indicated that the best products were composed of 20–30% amide and 70–80% carboxyl groups. The same is true where the dispersant is prepared by a copolymerization reaction such as by the copolymerization of acrylic acid and acrylamide.

The following table (Table 2) shows the reaction conditions used in preparing polyacrylonitriles of various molecular weights.

Example 2

A test was run using an aqueous alcohol solution with 0.0030% by weight of polymer. The polymer used was one having 20% amide groups and 80% carboxyl groups and an approximate molecular weight of 20,000.

The polymer was added to the aqueous alcohol after the zein was in solution and well before the solution was put into the distillation unit. Care was taken to see that the polymer was worked into the solution before the solution containing the zein reached the distillation unit. This feeding of the polymer was done at a point where the alcohol content of the solvent was 85.5% by weight of the total solvent.

The new solution, containing the alcohol, water and polymer was run into a distillation column and the alcohol was distilled off until it was 14.5% by weight of the total solvent. During this type of operation, the distillation unit would normally stay operable for a period of 3 to 7 days before waxy zein deposits would render the unit inoperable and require a shutdown for cleaning. During this initial run, the distillation unit was operated for 14 days before being shut down for inspection. Upon inspection after this 14 day run, it was found that the distillation unit was clean enough for continued operation, due to the effect of the improved solvent.

Another measure of the effectiveness of the solvent of the subject invention in this trial run is the ratio of solid matter in the distillation unit bottoms to the solid matter in the distillation unit feed, and more particularly, the comparison of the amount of protein in the distillation unit bottoms as compared to the amount of protein previously found in distillation unit bottoms. The ratio of solids in the distillation unit bottoms to solids in the feed and the protein found in the distillation unit bottoms during this test showed the effectiveness of the solvent of the subject invention in increasing zein output and decreasing zein deposits in the distillation unit.

It was found that the deposits which formed on the

TABLE 2.—SYNTHESIS OF POLYACRYLONITRILES OF VARIOUS MOLECULAR WEIGHTS

| Product No. | Ingredients (by weight) | | | | Reaction conditions | | Intrinsic viscosity | Molecular weight |
|---|---|---|---|---|---|---|---|---|
| | ACN | $H_2O$ | $(NH_4)_2S_2O_8$ | $Na_2S_2O_5$ | Temp., ° C. | Time, hrs. | | |
| 1 | 265 | 1,120 | 1.4 | 5.5 | 50–55 | 2 | 4.50 | 490,000 |
| 2 | 265 | 1,220 | 3.45 | 13.8 | 50–55 | 2 | 1.83 | 148,000 |
| 3 | 265 | 1,680 | 13.8 | 55.2 | 50–55 | 3.5 | | |
| 4 | 265 | 1,680 | 13.8 | 55.2 | 50–55 | 4 | 0.40 | 19,500 |
| 5 | 265 | 1,680 | 13.8 | 55.2 | 50–55 | 3 | 0.385 | 18,500 |
| 6 | 265 | 1,680 | 13.8 | 55.2 | 55 | 3.5 | 0.378 | 18,000 |
| 7 | 265 | 1,680 | 13.8 | 55.2 | 70–90 | 1.5 | 0.297 | 13,000 |

The mol ratio of caustic to acrylonitrile that is used in the hydrolysis is important in determining the extent and rate of hydrolysis. Table 3 shows the composition of products hydrolyzed for 17 to 19 hours using less than the theoretical amount of sodium hydroxide.

TABLE 3.—EFFECT OF CAUSTIC CONCENTRATION ON HYDROLYSIS OF POLYACRYLONITRILE

| | Mols NaOH per mol acrylonitrile | Hydrolysis time, hrs. | Composition | | |
|---|---|---|---|---|---|
| | | | CN | $CONH_2$ | $CO_2H$ |
| 1 | 0.3 | 19 | 12 | 30 | 58 |
| 2 | 0.5 | 17 | 3 | 30 | 67 |
| 3 | 0.6 | 17 | | 32 | 68 |
| 4 | 0.7 | 17 | | 32 | 68 |
| 5 | 0.8 | 17 | | | |
| 6 | 0.9 | 17 | | 29 | 71 | trays and interior surfaces of distillation units with prior art solvents consisted of waxy zein deposits and calcium deposits from the water used in the feed stock. After tests run with the solvent of the subject invention, it was found that the amount of calcium deposited on the trays and interior surfaces of the distillation unit was not decreased apprecibaly; however, the zein deposits were practically eliminated, indicating that the protein stayed in solution in greatly increased amounts, whereas the calcium did not.

It can be seen from the above experiment that the overall objective of providing an improved solvent for prolamin has been achieved to a substantial degree. Although the experiment noted above was done in a system where zein was the prolamin in solution, the solvent can also be used with other prolamins of a similar nature.

The invention is hereby claimed as follows:
1. An improved organic solvent for prolamin consisting essentially of:

| | Percent by weight |
|---|---|
| Lower alkanol | 5–90 |
| Water | 9.9900–94.9997 |
| Polymer | .0003–.0100 | wherein said polymer has from 20–30% amide groups and 70–80% carboxyl groups and a molecular weight of from 5,000 to 100,000 and is selected from the group consisting of hydrolyzed polyacrylonitrile and a copolymer of acrylic acid and acrylamide.

References Cited

UNITED STATES PATENTS 2,824,077   2/1958   Priest _____ 260—8

FOREIGN PATENTS 732,912   6/1955   Great Britain.

LEON D. ROSDOL, Primary Examiner

D. L. ALBRECHT, Assistant Examiner

U.S. Cl. X.R.

260—29.6, 123